(12) United States Patent
Schulte-Kellinghaus

(10) Patent No.: US 7,463,151 B1
(45) Date of Patent: Dec. 9, 2008

(54) SYSTEMS AND METHODS FOR PROVIDING MOBILE SERVICES USING SHORT-RANGE RADIO COMMUNICATION DEVICES

(75) Inventor: Hermann Schulte-Kellinghaus, Bottrop (DE)

(73) Assignee: Openwave Systems Inc., Redwood City, CA (US)

( * ) Notice: Subject to any disclaimer, the term of this patent is extended or adjusted under 35 U.S.C. 154(b) by 257 days.

(21) Appl. No.: 11/394,797

(22) Filed: Mar. 31, 2006

Related U.S. Application Data

(60) Provisional application No. 60/668,242, filed on Apr. 4, 2005.

(51) Int. Cl.
*G08B 13/14* (2006.01)
(52) U.S. Cl. .................................................. 340/572.1
(58) Field of Classification Search ... 340/572.1–572.9, 340/10.52, 825.69; 455/415, 456.1; 379/67.1, 379/142.01
See application file for complete search history.

(56) References Cited

U.S. PATENT DOCUMENTS

| | | | | |
|---|---|---|---|---|
| 2004/0029564 | A1* | 2/2004 | Hodge | 455/411 |
| 2004/0203895 | A1* | 10/2004 | Balasuriya | 455/456.1 |
| 2004/0212493 | A1* | 10/2004 | Stilp | 340/531 |

OTHER PUBLICATIONS

"Getting on Board", Dody Tsiantar, *Time Magazine*, [online] [retrieved on Apr. 7, 2006] pp. 1-4, http://www.time.com/time/insidebiz/printout/0,8816,1179359,00.html.

* cited by examiner

*Primary Examiner*—Phung Nguyen
(74) *Attorney, Agent, or Firm*—Townsend and Townsend and Crew LLP

(57) ABSTRACT

Systems and methods for providing mobile services using short-range radio communication devices. A method may include receiving a short-range radio communication (SRC) device information acquired by an SRC-enabled mobile terminal, authenticating the SRC device information, and allowing a mobile service to be provided to an SRC-enabled mobile terminal in response to the authenticating step. A system may include an SRC device information server connected to a mobile network and an SRC device information database connected to the SRC device information server, where the SRC device information server allows the mobile network to provide a service to an SRC-enabled mobile terminal upon querying the SRC device information database for an SRC device information match.

22 Claims, 6 Drawing Sheets

SYSTEMS AND METHODS FOR PROVIDING MOBILE SERVICES USING SHORT-RANGE RADIO COMMUNICATION DEVICES

TECHNICAL FIELD

The present invention relates generally to mobile wireless networks and, more particularly, to systems and methods for providing mobile services using short-range radio communication devices.

BACKGROUND

Telecommunication carriers often provide location-based mobile services. In order to determine whether a user has requested a service from within an authorized location, a carrier may identify the particular cellular or base station servicing the user's mobile terminal at the time of the request. Carriers have also used Global Positioning Systems ("GPS") for determining a user's location.

BRIEF SUMMARY

Certain aspects of the present invention are directed to the localization and authentication of mobile users within a mobile network. Other aspects of the present invention are directed to the provision of services to mobile users based, at least in part, upon their location. In some embodiments, the present invention may employ at least one short-range radio communication ("SRC") device in order to localize, authenticate, and/or provide mobile services.

In one exemplary, non-limiting embodiment, a method may comprise providing an SRC device within a mobile network, where the SRC device is operable to communicate information to an SRC-enabled mobile terminal. The SRC-enabled mobile terminal may acquire this information and use it to access a mobile service. The information provided by the SRC device may be indicative of the SRC device's location or identification. As such, the information acquired by the SRC-enabled mobile terminal may be used by the mobile network to localize, authenticate, and/or provide services to the mobile user. In another exemplary, non-limiting embodiment, a system may comprise an SRC device information server coupled to a mobile network, where the SRC device information server allows a mobile service to be provided to a mobile user operating an SRC-enabled mobile terminal upon authenticating an SRC device information previously or simultaneously provided to the SRC-enabled mobile terminal by an SRC device located within the mobile network.

DRAWINGS

DETAILED DESCRIPTION

Figure 1:
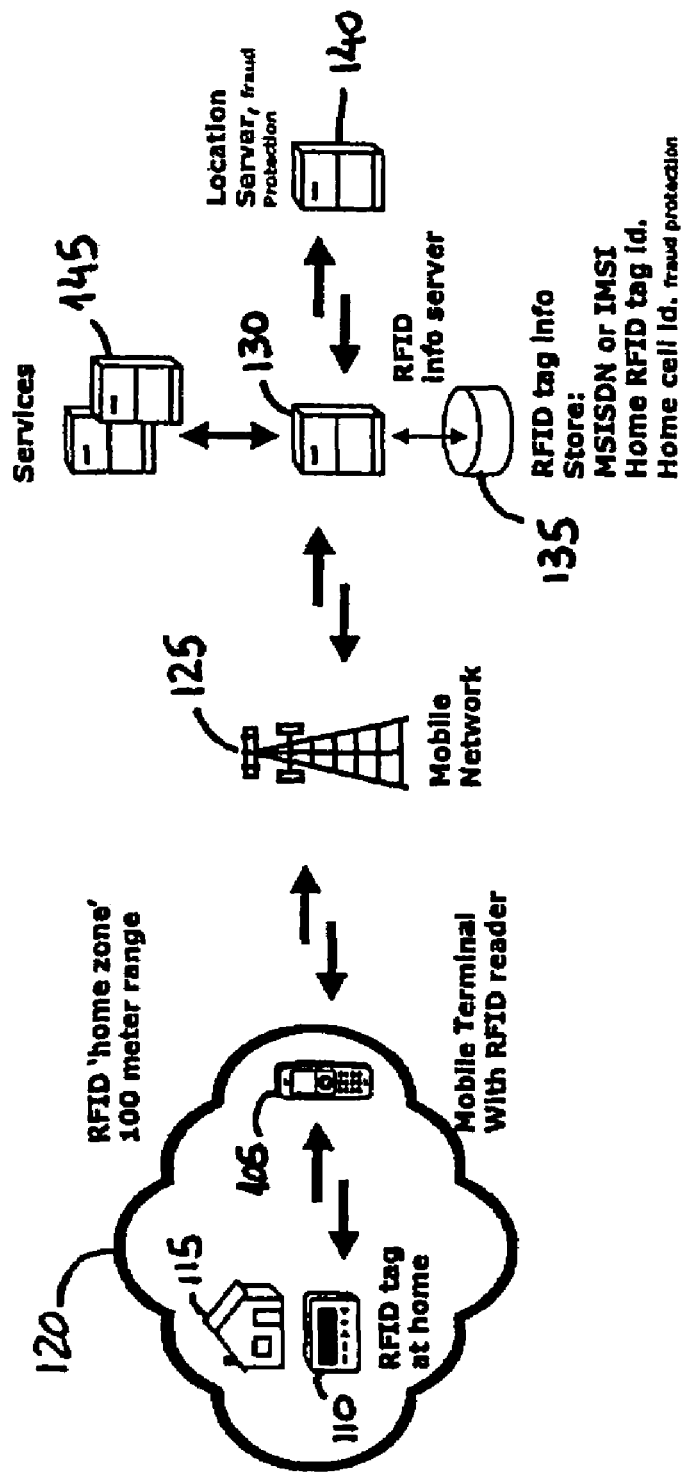
FIG. 1 is a diagram of an RFID system embodying one aspect of the present invention.

The inventor hereof has recognized that locating a mobile subscriber by identifying a particular cell servicing the user's mobile terminal presents a number of problems. For instance, in rural areas, where cell sizes have grown to cover up to 20 km in diameter, or even wider, some customers may remain within their "home zones" even though they may not be at home. Moreover, the inventor hereof has also recognized that using Global Positioning Systems in order to determine the user's location results in a very slow localization process. For example, an typical A-GPS localization system can take up to 20 seconds or longer to locate a subscriber.

In one embodiment, the present invention may employ at least one SRC device such as, for example, an RFID tag, a Bluetooth base station or transponder, or a WiFi device such as a wireless router or the like. The SRC device may be provided within a mobile network and be operable to communicate information to an SRC-enabled mobile terminal. SRC-enabled mobile terminals currently available include, for example, the Nokia 5140, 5140i, and 3220 RFID-enabled phones, among many other Bluetooth and WiFi-enabled devices and phones made by a variety of manufacturers. In one embodiment, the SRC device is physically fixed within a mobile network. In another embodiment, the SRC device may transit within the mobile network.

An SRC-enabled mobile terminal may acquire SRC device information from an SRC device, for example, before requesting a service from a mobile network. Upon a service request from the SRC-enabled mobile terminal, the mobile network may verify whether the terminal is authorized to access the service based on the SRC device information received. This information may include, for instance, the identity of the SRC device. Alternatively or additionally, the information acquired may include the location of the SRC device. Accordingly, the mobile network may determine the location of the SCR-enabled terminal based on the location or identity of the SRC device. The location of the SRC-enabled terminal may in turn be used by the mobile network to selectively provide a service to the SRC-enabled mobile terminal.

In another embodiment, an SRC device information server may be connected to a mobile network and may be operable to allow a mobile service to be provided to a user operating an SRC-enabled mobile terminal upon verifying an SRC device information previously or simultaneously acquired by the SRC-enabled mobile terminal. In one embodiment, an SRC device may be pre-programmed with identification information and placed within a mobile network. In another embodiment, the SRC information server may push identification information to an SRC device via the mobile network, another telephone network, or a computer network such as, for example, the Internet. The SRC device may then transmit its identification information to an SRC-enabled mobile terminal that is within its range. The SRC information server may verify information provided to the SRC-enabled mobile terminal, for example, upon receiving a service request from the SRC-enabled mobile terminal.

The term "mobile network," as used herein, may include cellular networks such as Global System for Mobile Communications ("GSM"), Time Division Multiple Access ("TDMA"), Code Division Multiple Access ("CDMA"), and Personal Communications Service ("PCS") networks, among others. The term "mobile terminal," as used herein, may include cellular telephones, pagers, personal digital assistants ("PDAs"), laptops, computers, etc. The term "SRC technology," as used herein, may include any short-range radio communications technology now existing or yet to be developed, including, for example, radio frequency identification ("RFID"), IEEE 802.15 ("Bluetooth"), and IEEE 802.11 ("WiFi"), among others. The term "SRC device," as used herein, may include any device that is capable of using SRC technology to communicate information to an SRC-enabled mobile terminal, including RFID tags, a Bluetooth transponders, and WiFi transponders, among many others. The term "SRC-enabled mobile terminal," as used herein, may include any mobile device that is capable of using SRC technology to receive or acquire information communicated to it by an SRC device.

Referring to FIG. 1, RFID system 100 is depicted according to one exemplary embodiment of the present invention. In this embodiment, RFID tag (i.e., SRC device) 110 is placed within "home zone" 120, which may be a subscriber's home or office 115. RFID tag 110 may be passive, semi-passive, or active. Furthermore, RFID tag 110 may contain an Electrically Erasable Programmable Read-Only Memory ("EE-PROM") or another type of nonvolatile memory for storing data. RFID-enabled mobile terminal (i.e., SRC-enabled mobile terminal) 105 is operable to read an RFID tag information (i.e., SRC device information) from RFID tag 110. RFID-enabled mobile terminal 105 is also operable to connect to mobile network 125. Mobile network 125 is coupled to RFID tag information server (i.e., SRC information server) 130. RFID tag information server 130 may be coupled to an RFID tag information database (i.e., SRC information database) 135, a services server 145, and/or a location server 140.

RFID tag 110 may be placed within home zone 115. Thereafter, each time the subscriber initiates an action that requires home zone verification, RFID-enabled mobile terminal 105 may begin a look-up session to find a nearby RFID tag. If any RFID tags are within the RFID-enabled mobile terminal's 105 range, an RFID tag identification information (i.e., SRC device information) may be provided to RFID-enabled mobile terminal 105. RFID-enabled mobile terminal 105 may then send the acquired RFID information to RFID tag information server 130. RFID tag information server 130 may verify whether the provided RFID tag identification information matches the subscriber's home zone information. If there is a match, the user may be granted home zone services by the service provider. Otherwise, services may be treated as "non-home zone." Accordingly, if there is no RFID tag within the RFID-enabled mobile terminal's 105 range, services may still provided as "non-home zone" services.

In one embodiment, RFID tag 110 may be a transponder electronically programmed with unique identification information. RFID-enabled mobile terminal 105 may comprise a mobile terminal with an integrated RFID reader, where the integrated RFID reader includes an antenna. The integrated RFID reader may emit radio waves in ranges between one inch to 100 feet or more, depending upon its power output and the radio frequency used. When the integrated RFID reader passes through the RFID tag's 110 electromagnetic zone, it detects an activation signal. The integrated RFID reader decodes the data encoded in the RFID tag's 110 integrated circuit and its RFID tag information is passed to the mobile network 125. In order to prevent fraud, once RFID tag 110 is fixed in the subscriber's home zone, it may not be removed in working condition. In another embodiment, more than one RFID tag may be used to define the home zone.

The present invention may be combined, for example, with existing location services using cell ID technology. In such case, each request to access services may also verify whether the subscriber's location matches the home zone cell ID by using the location server 140. As one of ordinary skill in the art will understand in light of this disclosure, the RFID tag 110 may be placed in a subscriber's workplace, or in a public area such as, for example, a retail store. Moreover, the home zone verification process may be initiated by the mobile network 125 depending upon which services the subscriber is requesting. Alternatively, the home zone verification method of the present invention may also be initiated by the RFID-enabled mobile terminal 105.

An SRC device such as RFID tag 110 of FIG. 1 may also be used in public or commercial environments. For example, an SRC device may be placed inside a retail store, airport, or shopping mall. A customer visiting a store may operate an SRC-enabled mobile which may obtain an access code from an SRC device placed within the store. The SRC-enabled mobile terminal may use the access code to obtain a mobile service free of charge or at a promotional rate over a mobile network. Moreover, SRC devices need not be physically fixed within a mobile network. In another example, an SRC device may be mounted on an advertising vehicle in order to temporarily provide a mobile service to SRC-enabled mobile terminals within the vehicle's range. Further, this reduced rate service may be provided while an advertisement is displayed on the SRC enabled mobile terminal.

Figure 2:
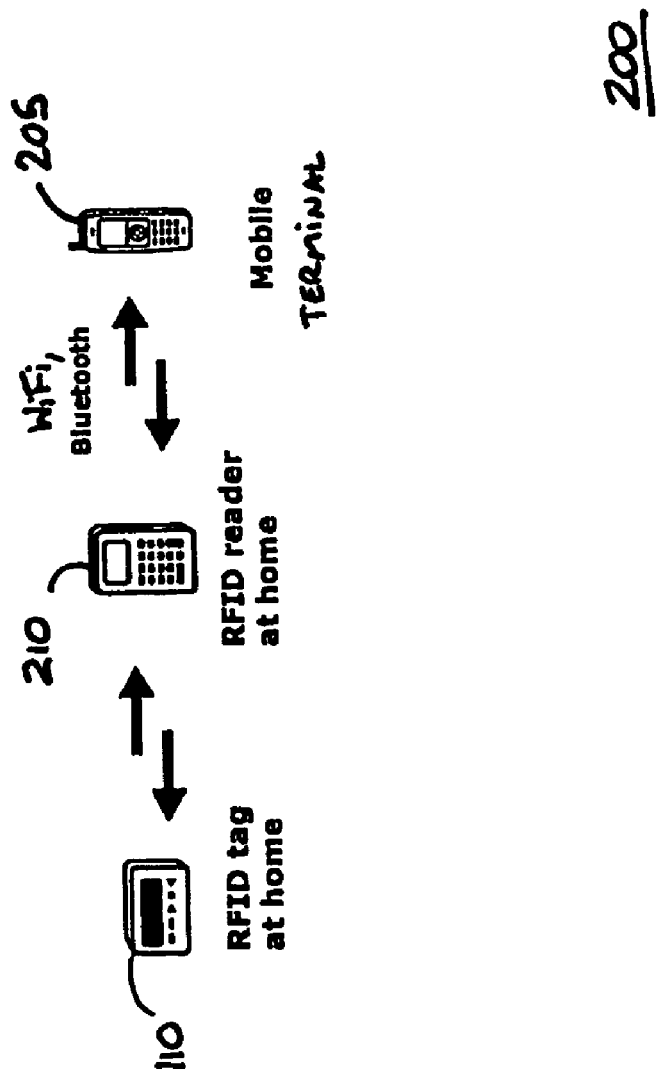
FIG. 2 is a diagram of a hybrid system embodying another aspect of the present invention.

Referring to FIG. 2, a hybrid system 200 is depicted according to another exemplary embodiment of the present invention. WiFi or Bluetooth enabled-mobile terminal (i.e., SRC-enabled mobile terminal) 205 is operable to connect with external WiFi or Bluetooth-enabled RFID reader (i.e., SRC reader) 210. External WiFi or Bluetooth-enabled RFID reader 210 is operable to read an RFID tag information from RFID tag (i.e., SRC device) 110 upon a request from WiFi or Bluetooth enabled-mobile terminal 205. As a person of ordinary skill in the art will recognize in light of this disclosure, Bluetooth, WiFi, WiMAX, or any other wireless protocol may be used. This examplary embodiment does not require that an RFID reader be integrated with a mobile terminal, thereby taking advantage of several commercially available mobile that are Bluetooth, WiFi, or WiFi enabled.

Figure 3:
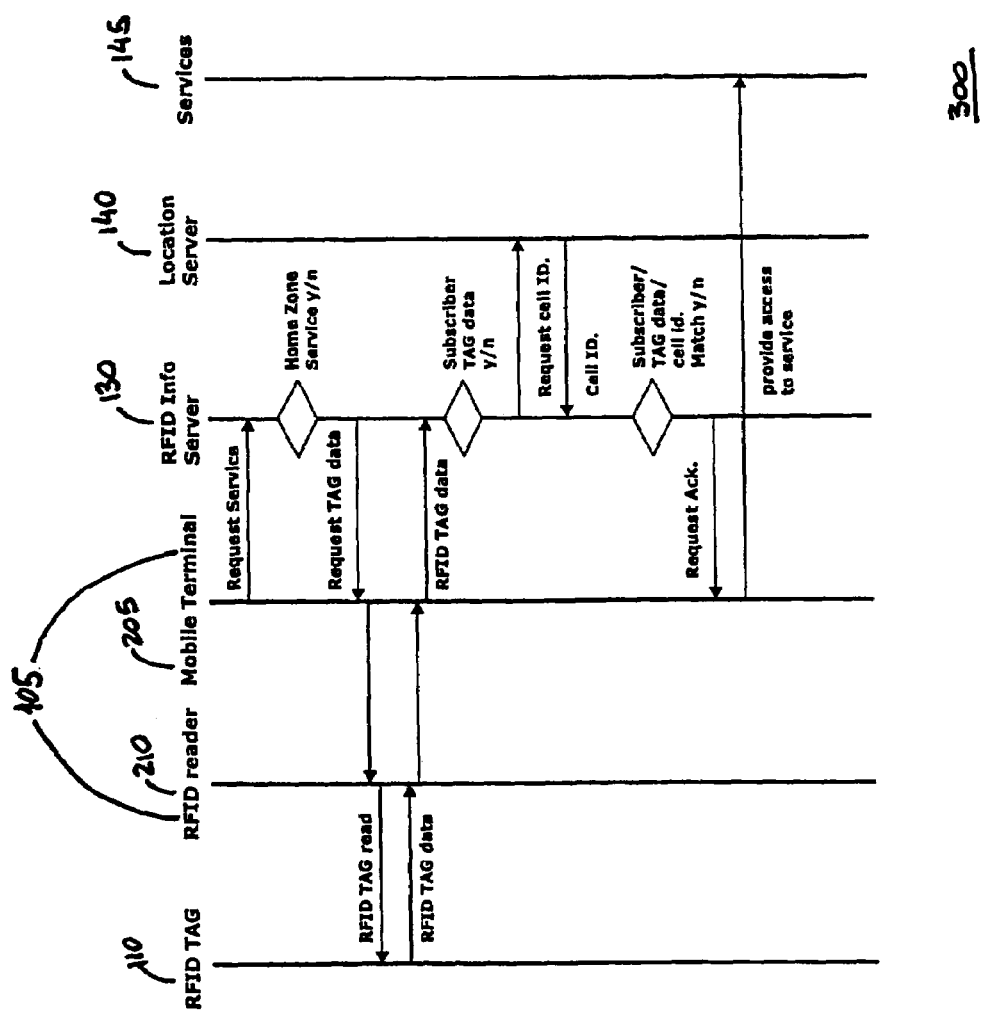
FIG. 3 is a first call flow diagram of a terminal initiated service request embodying the present invention.

Referring to FIG. 3, a first call flow diagram of a terminal initiated service request 300 is depicted according to an exemplary embodiment of the present invention. In a first step, RFID-enabled mobile terminal 105 requests service from RFID tag information server 130. RFID tag information server 130 determines whether the subscriber is requesting a home zone service. If so, RFID tag information server 130 requests an RFID tag information from RFID-enabled mobile terminal 105, which queries RFID tag 110 via integrated or external RFID reader 105 or 210, respectively, and returns RFID tag information to RFID tag information server 130. RFID tag information server 130 determines whether the RFID tag information received matches the subscriber's home zone information stored in RFID tag information database 135. RFID tag information server 130 may also query location server 140 to determine whether the cell ID matches the subscriber's home zone cell ID. If so, RFID-enabled mobile terminal 105 is granted access to a home zone service through service server 145.

Figure 4:
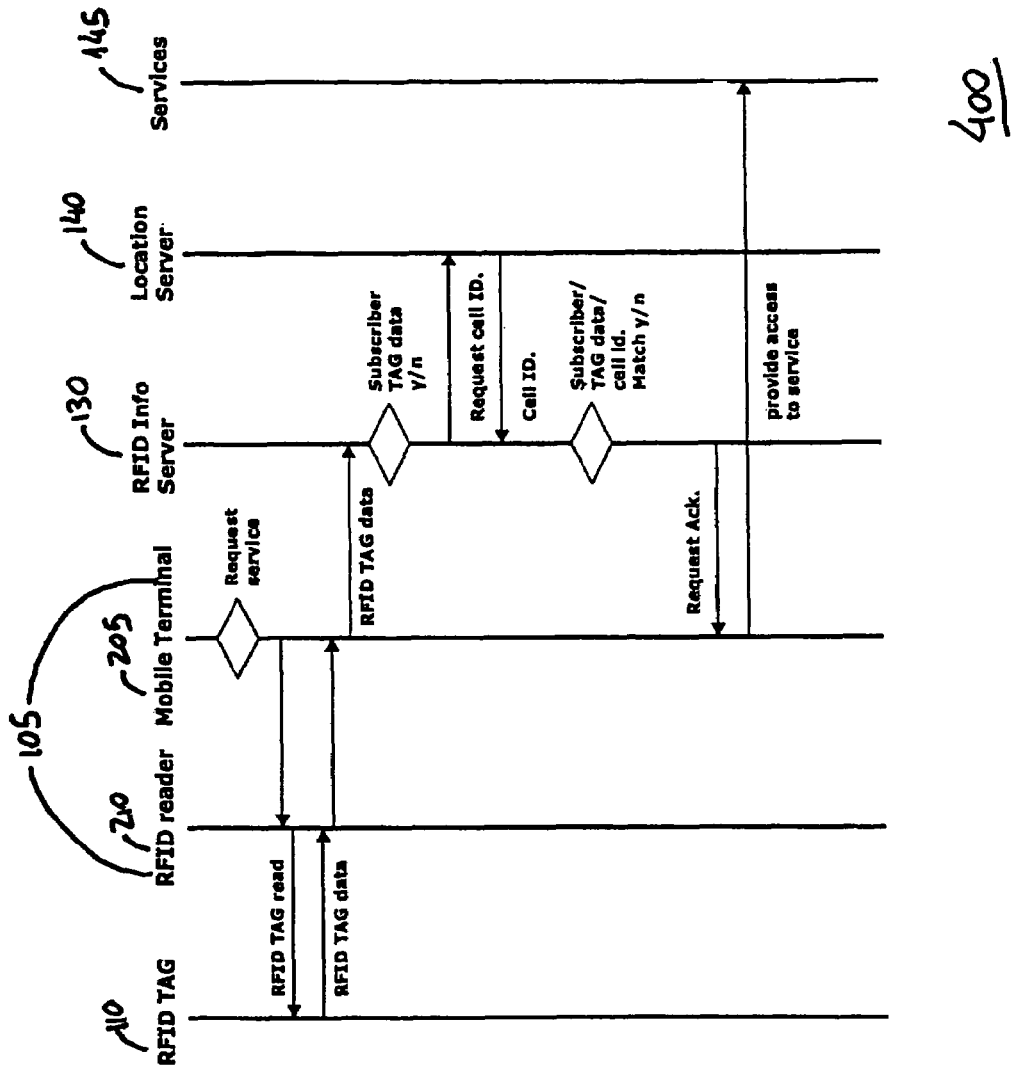
FIG. 4 is a second call flow diagram of a terminal initiated service request embodying the present invention.

Referring to FIG. 4, a second call flow diagram of a terminal initiated service request 400 is depicted according to an exemplary embodiment of the present invention. This embodiment is similar to the one depicted in FIG. 3. However, before a service request originating from RFID-enabled mobile terminal 105 is sent to the RFID tag information server 130 through mobile network 125, an RFID read request is performed in anticipation of a localization query by RFID tag information server 130.

Figure 5:
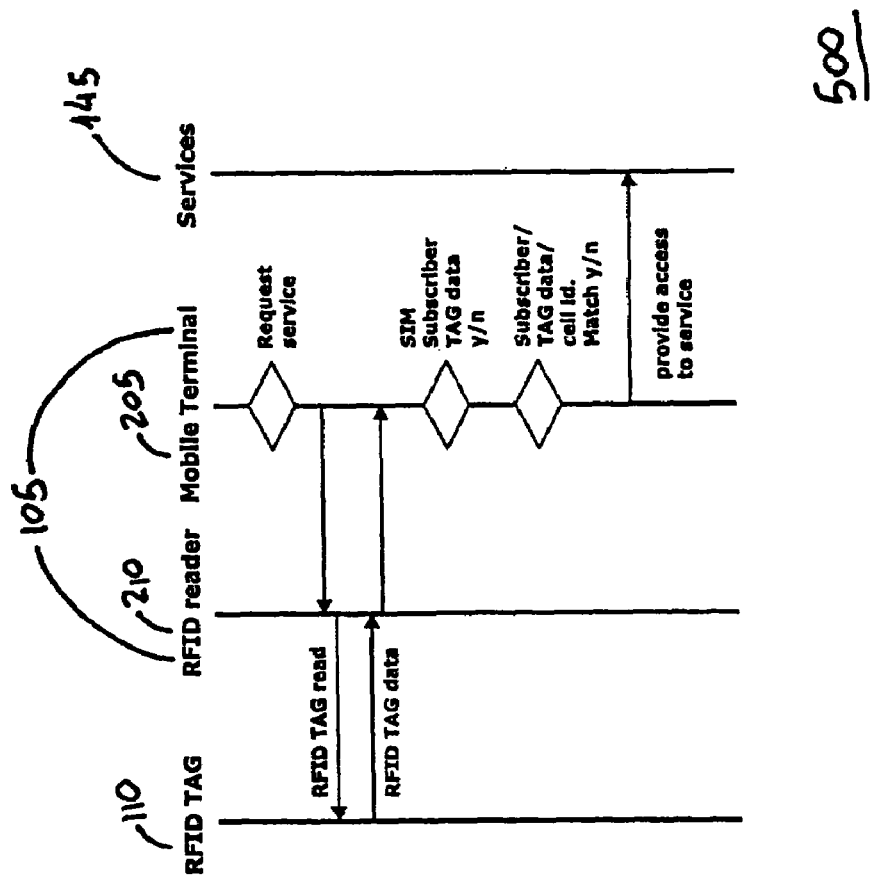
FIG. 5 is a third call flow diagram of a terminal initiated service request embodying the present invention.

Referring to FIG. 5, a third call flow diagram of a terminal initiated service request 500 is depicted according to an exemplary embodiment of the present invention. In this embodiment, the matching between the home-zone and the RFID tag information may be handled by a Subscriber Identity Module (SIM) card within RFID-enabled mobile terminal 105. This particular solution may be desirable if, for example, latency concerns require a more terminal-centric solution. In a first step, RFID-enabled mobile terminal 105 queries RFID tag 110 via integrated or external RFID reader 105, 210, and returns an RFID tag information. Then, RFID-enabled mobile terminal 105 determines whether there is a match between RFID tag information and the home zone information. RFID-enabled mobile terminal 105 may also determine whether the cell ID matches the subscriber's home zone cell ID. If so, RFID-enabled mobile terminal 105 is granted access to home zone services.

Figure 6:
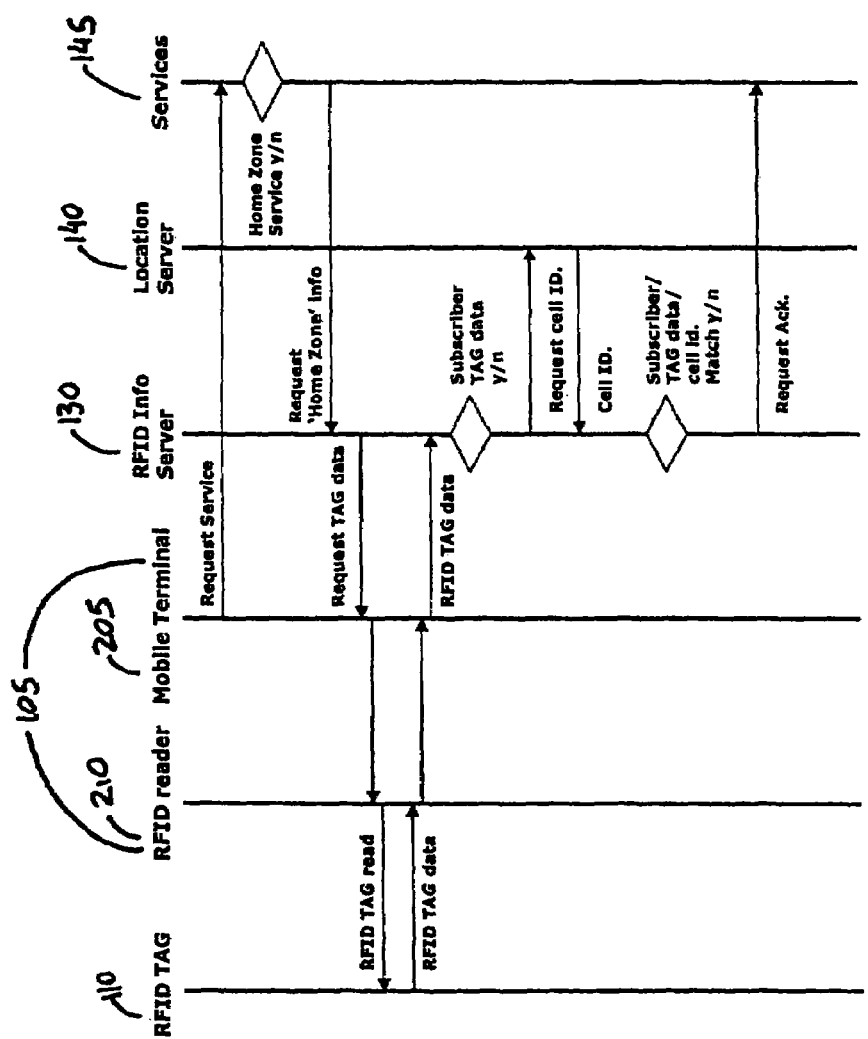
FIG. 6 is a call flow diagram of a network initiated service request embodying the present invention.

Referring to FIG. 6, a call flow diagram of a network initiated service request 600 is depicted according to an exemplary embodiment of the present invention. This embodiment is similar to those depicted in FIGS. 3 and 4, except that a service request from RFID-enabled mobile terminal 105 reaches service server 145, which in turn identifies whether a home zone service is being requested, thereby triggering an RFID read request to RFID-enabled mobile terminal 105.

In one embodiment of the invention, short-range radio communication (SRC) device information is acquired by an SRC-enabled mobile terminal. The SRC device information is authenticated, and then a mobile service is provided to the SRC-enabled mobile terminal. The SRC device information may be authenticated by determining whether the SRC device information matches information stored in an SRC device information database. The mobile service provided to the SRC-enabled mobile terminal may be a promotional mobile service temporarily provided to the SRC-enabled mobile terminal.

The location of the SRC-enabled mobile terminal may be determined based upon the SRC device information. The SRC device information programmed into an SRC device may include location information. The SRC device information may be pushed to the SRC device via a network.

In an alternative embodiment, the present invention comprises a system in which an SRC device information server is connected to a mobile network, and an SRC device information database is connected to the SRC device information server, where the SRC device information server allows the mobile network to provide a service to an SRC-enabled mobile terminal upon querying the SRC device information database. The SRC device may be fixed within the mobile network or may transit within the mobile network, such as, for example, an SRC device attached to a vehicle, person or other moving object. The SRC device may be an RFID tag, and the SRC-enabled mobile terminal may be an RFID-enabled terminal.

In another embodiment, the a short-range radio communication (SRC) device is transited or moved within a mobile network. An SRC-enabled mobile terminal acquired an access code from the SRC device. A mobile service is provided to the SRC-enabled mobile terminal when the SRC-enabled mobile terminal accesses a mobile network using the access code. The SRC device may be placed on a vehicle, for example, and the mobile service may be provided while the SRC-enabled mobile terminal is within range of the vehicle. For example, if the SRC device was placed on a bus, train or other public transportation system, users could access a mobile service at a reduced or special rate via their SRC-enabled mobile terminal. The SRC device may also be on a mobile advertising vehicle so that users can access a special or reduce rate for mobile services on their SRC-enabled mobile device when they are within range of the mobile advertising vehicle. Alternatively, the mobile service may push advertisements to the SRC-enabled mobile terminal when the terminal is within range of an SRC device.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for providing a mobile service to a short-range radio communication (SRC) enabled mobile terminal over a mobile network, the method comprising:
   receiving SRC device information from the SRC-enabled mobile terminal over the mobile network, the SRC device information acquired by the SRC-enabled mobile terminal from an SRC device;
   authenticating the SRC device information; and
   in response to authenticating the SRC device information, providing the mobile service to the SRC-enabled mobile terminal over the mobile network.

2. The method of claim 1 further comprising determining the location of the SRC-enabled mobile terminal using the SRC device information.

3. The method of claim 1 further comprising programming the SRC device information into the SRC device, the SRC device information including information regarding the SRC device's identification.

4. The method of claim 1, wherein the SRC device information includes information regarding the SRC device's location.

5. The method of claim 1 further comprising pushing the SRC device information to the SRC device via a communication network, wherein the communication network is the mobile network, a telephone network, or a computer network.

6. The method of claim 1 wherein authenticating the SRC device information comprises determining whether the SRC device information matches information stored in an SRC device information database.

7. The method of claim 1, wherein the SRC-enabled mobile terminal is a cellular phone, a Bluetooth enabled device, a WiFi enabled device, a pager, a personal digital assistant (PDA), or a computer; and
   wherein the SRC device is a radio frequency identification (RFID) tag, a Bluetooth transponder, or a WiFi transponder.

8. The method of claim 1, wherein the service provided is one of a set of services available, the set of services available determined at least in part based on the SRC device information.

9. A system for providing a mobile service to a short-range radio communication (SRC) enabled mobile terminal over a mobile network, the system comprising:
   means for receiving SRC device information from the SRC-enabled mobile terminal over the mobile network, the SRC device information acquired by the SRC-enabled mobile terminal from an SRC device;
an SRC device information server connected to the mobile network; and
an SRC device information database connected to the SRC device information server,
where the SRC device information server executes a process to authenticate the SRC device information and where, in response to authenticating the SRC device information, the mobile service is provided to the SRC-enabled mobile terminal over the mobile network.

10. The system of claim 9 further comprising the SRC device being located within the mobile network, the SRC device including the SRC device information.

11. The system of claim 10 where the SRC device is fixed within the mobile network.

12. The system of claim 10 where the SRC device transits within the mobile network.

13. The system of claim 9, wherein the SRC device is a radio frequency identification (RFID) tag, a Bluetooth transponder, or a WiFi transponder.

14. The system of claim 13, wherein the SRC-enabled mobile terminal is a cellular phone, a Bluetooth enabled device, a WiFi enabled device, a pager, a personal digital assistant (PDA), or a computer.

15. The system of claim 9 further comprising a location server connected to the SRC device information server.

16. The system of claim 9 further comprising a services server connected to the SRC device information server.

17. A method for receiving a mobile service over a mobile network, the method comprising:
acquiring an access code from a short range communication (SRC) device by using an SRC-enabled mobile terminal;
making a request to a mobile service provider over the mobile network to provide the mobile service;
providing the access code to the mobile service provider over the mobile network; and
receiving the mobile service over the mobile network.

18. The method of claim 17, wherein the SRC-enabled mobile terminal is a cellular phone, a Bluetooth enabled device, a WiFi enabled device, a pager, a personal digital assistant (PDA), or a computer; and
wherein the SRC device is a radio frequency identification (RFID) tag, a Bluetooth transponder, or a WiFi transponder.

19. The method of claim 17 where the SRC-enabled mobile terminal receives the mobile service at a special or reduced rate.

20. The method of claim 17, wherein the mobile service received includes an advertisement.

21. A method for providing a promotional mobile service to a short-range radio communication (SRC) enabled mobile terminal over a mobile network, the method comprising:
receiving SRC device information from the SRC-enabled mobile terminal over the mobile network, the SRC device information acquired by the SRC-enabled mobile terminal from an SRC device;
authenticating the SRC device information; and
in response to authenticating the SRC device information, providing the promotional mobile service to the SRC-enabled mobile terminal over the mobile network on a time-limited basis.

22. A method for receiving an advertisement over a mobile network, the method comprising:
acquiring short range communication (SRC) device information from a SRC device using an SRC-enabled mobile terminal;
providing the SRC device information to a mobile service provider over the mobile network; and
receiving the advertisement over the mobile network.

* * * * *

(12) POST-GRANT REVIEW CERTIFICATE (15th)

United States Patent
Schulte-Kellinghaus

(10) Number: US 7,463,151 J1
(45) Certificate Issued: Jan. 22, 2016

(54) SYSTEMS AND METHODS FOR PROVIDING MOBILE SERVICES USING SHORT-RANGE RADIO COMMUNICATION DEVICES

(75) Inventor: Hermann Schulte-Kellinghaus

(73) Assignee: UNWIRED PLANET, LLC

Trial Number:

CBM2014-00004 filed Oct. 8, 2013

Petitioner: Google Inc.

Patent Owner: Unwired Planet, LLC

Post-Grant Review Certificate for:

Patent No.: 7,463,151
Issued: Dec. 9, 2008
Appl. No.: 11/394,797
Filed: Mar. 31, 2006

The results of CBM2014-00004 are reflected in this post-grant review certificate under 35 U.S.C. 328(b).

POST-GRANT REVIEW CERTIFICATE
U.S. Patent 7,463,151 J1
Trial No. CBM2014-00004
Certificate Issued Jan. 22, 2016

AS A RESULT OF THE POST-GRANT REVIEW PROCEEDING, IT HAS BEEN DETERMINED THAT:

Claims 21 and 22 are cancelled.

\* \* \* \* \*

(12) INTER PARTES REVIEW CERTIFICATE (120th)
United States Patent
Schulte-Kellinghaus

(10) Number: US 7,463,151 K1
(45) Certificate Issued: Jan. 22, 2016

(54) SYSTEMS AND METHODS FOR PROVIDING MOBILE SERVICES USING SHORT-RANGE RADIO COMMUNICATION DEVICES

(75) Inventor: Hermann Schulte-Kellinghaus

(73) Assignee: UNWIRED PLANET, LLC

Trial Number:

IPR2014-00027 filed Oct. 8, 2013

Petitioner: Google Inc.

Patent Owner: Unwired Planet, LLC

Inter Partes Review Certificate for:

Patent No.: 7,463,151
Issued: Dec. 9, 2008
Appl. No.: 11/394,797
Filed: Mar. 31, 2006

The results of IPR2014-00027 are reflected in this inter partes review certificate under 35 U.S.C. 318(b).

INTER PARTES REVIEW CERTIFICATE
U.S. Patent 7,463,151 K1
Trial No. IPR2014-00027
Certificate Issued Jan. 22, 2016

AS A RESULT OF THE INTER PARTES REVIEW PROCEEDING, IT HAS BEEN DETERMINED THAT:

Claims 21 and 22 are cancelled.

\* \* \* \* \*